United States Patent [19]

Komatz

[11] Patent Number: 4,679,680
[45] Date of Patent: Jul. 14, 1987

[54] CLUTCH MASTER CYLINDER WITH INTERNAL RESERVOIR

[75] Inventor: Dennis J. Komatz, Birmingham, Mich.

[73] Assignee: Lucas Industries Public Limited Company, Birmingham, England

[21] Appl. No.: 633,869

[22] Filed: Jul. 23, 1984

Related U.S. Application Data

[63] Continuation-in-part of Ser. No. 549,508, Nov. 7, 1983, abandoned.

[51] Int. Cl.⁴ .................. B60T 11/16; F16D 65/32
[52] U.S. Cl. ........................ 192/85 R; 192/99 S; 60/589; 60/592
[58] Field of Search ............... 60/585, 586, 587, 589, 60/592; 192/3.57, 99 S, 85 R

[56] References Cited

U.S. PATENT DOCUMENTS

| | | | |
|---|---|---|---|
| 1,786,912 | 12/1930 | Madden | 60/589 |
| 2,525,740 | 10/1950 | Trevaskis | 60/589 |
| 2,602,297 | 7/1952 | Farina | 60/587 |
| 2,758,444 | 8/1956 | White | 60/589 |
| 3,390,524 | 7/1968 | Yardley et al. | 60/586 |

FOREIGN PATENT DOCUMENTS

| | | |
|---|---|---|
| 3002850 | 7/1981 | Fed. Rep. of Germany . |
| 2037917 | 7/1980 | United Kingdom . |
| 311469 | 10/1971 | U.S.S.R. . |

Primary Examiner—George H. Krizmanich
Attorney, Agent, or Firm—Harness, Dickey & Pierce

[57] ABSTRACT

A master cylinder employed in connection with a fluid actuated motor vehicle clutch system. The master cylinder includes an internal reservoir formed by a portion of the same cylindrical housing which makes up the clutch actuating working chamber. A plug is provided within the cylindrical housing to divide the housing into two sections, a working chamber and a reservoir chamber. The plug further includes a check valve system which permits fluid to flow into and out of the working chamber from the reservoir as the fluid capacity of the associated hydraulic circuit changes. Flow into and out of the reservoir is permitted to occur only when an externally applied load to the master cylinder is released. The reservoir chamber includes a slidable piston and a low spring constant helical spring which biases the reservoir plunger to provide a slight hydrostatic pressure for the fluid contained by the reservoir, thereby preventing the ingestion of air or contaminants. In an embodiment of the invention, the fluid in the reservoir chamber may be initially pressurized to a greater than atmospheric pressure so as to give a small degree of boost to the system. This design configuration eliminates the requirement of providing an externally mounted reservoir or a reservoir which is mounted above the working chamber such that fluid therein is gravity fed into the working chamber. This design also permits the use of manufacturing techniques such as deep drawing of metal to construct the entire master cylinder and reservoir from a single tube structure.

4 Claims, 3 Drawing Figures

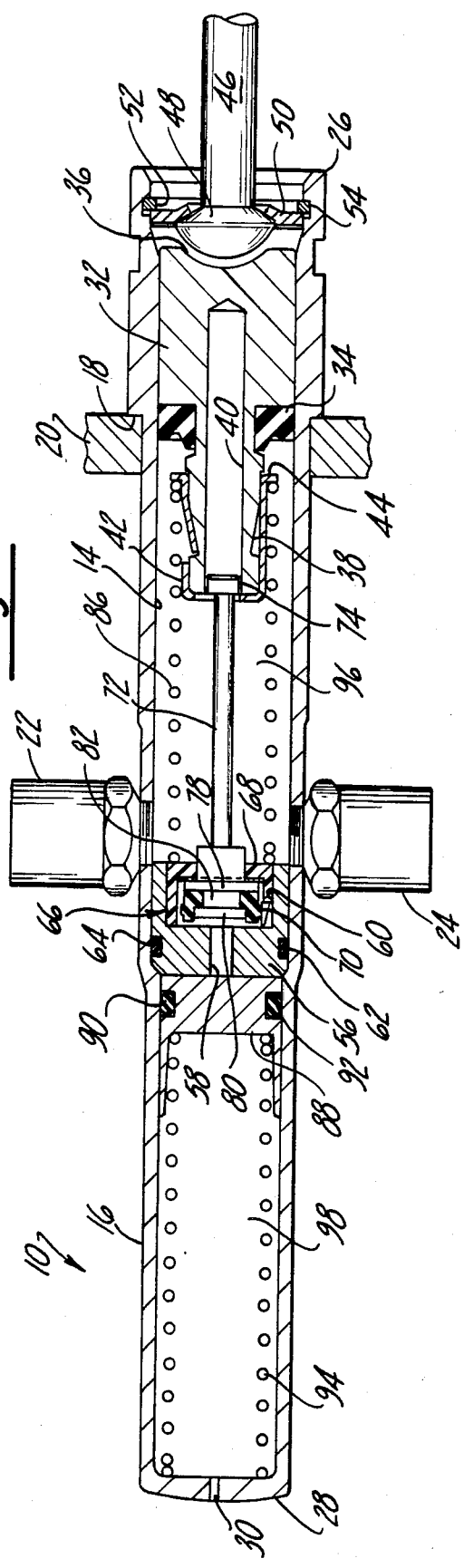

4,679,680

CLUTCH MASTER CYLINDER WITH INTERNAL RESERVOIR

CROSS REFERENCE TO RELATED APPLICATION

This application is a continuation-in-part of my application of the same title, Ser. No. 549,508, filed Nov. 7, 1983 now abandoned and assigned to the assignee of this application.

BACKGROUND AND SUMMARY OF THE INVENTION

This invention relates to a device for controllably supplying hydraulic pressure and particularly to a master cylinder particularly useful for activating a hydraulically controlled clutch of a motor vehicle.

Motor vehicles employing manually shiftable transmissions typically include a manually actuated drive clutch. The clutch is employed to selectively couple and uncouple the motor vehicle engine output with the drive transmission thereby permitting gear changes. Several types of clutch actuation systems are currently employed. Mechanically actuated types employ linkages or cables to effect clutch engagement and disengagement. Another type, with which this invention is particularly adapted, employs a remotely mounted slave cylinder which responds to a hydraulic pressure source to cause engagement or disengagement of the clutch as a fluid pressure responsive piston is caused to translate within the slave cylinder bore. For this latter type of clutch actuation system, a clutch master cylinder is provided which supplies the fluid pressure signal to the slave cylinder in response to forces applied to an internal slidable plunger exerted by foot pressure of the motor vehicle operator on a movable clutch pedal within the interior compartment of the vehichle. For either type of clutch actuation system, engagement and disengagement occurs due to reciprocal translation of a clutch release or throw-out bearing which engages rotating fingers of a clutch pressure plate. These fingers cause the clutch plate to selectively clamp or unclamp a clutch disc between itself and the engine flywheel, thereby effectuating the coupling and uncoupling function. Clutch discs are typically covered with friction material which wears through cycles of clutch actuation, therefore, means for compensating for such wear and its effect on the actuation system is needed.

Hydraulically actuated clutch master cylinders heretofore available employ a slidable plunger within a cylinder bore where the plunger is biased by spring force in a clutch engaged position. Due to fluid displacement within the hydraulic circuit, which occurs as the friction material of the clutch plate is worn away, a reservoir for hydraulic fluid must be provided for the master cylinder. Heretofore, fluid actuated clutch cylinders employed a separate or integrally mounted container of hydraulic fluid mounted above the master cylinder such that as fluid displacement occurs, the reservoir could provide or accept fluid. Such action by the reservoir occurs when the plunger uncovers a port communicating the master cylinder working chamber with the fluid reservoir. This configuration necessitated that the fluid reservoir be located above the master cylinder in order to prevent air ingestion within the hydraulic circuit and to provide gravity feed of fluid to the master cylinder. This requirement of mounting a fluid reservoir above the master cylinder requires an externally mounting reservoir or a machined clutch master cylinder housing providing an integral reservoir disposed above the housing. The necessity of providing such a reservoir, besides adding costs, tends to limit the types of production techniques which may be employed in fabricating the master cylinder housing.

In view of these above considerations, it is a principal aspect of this invention to provide a fluid activated clutch master cylinder of simplified construction and which may be produced at a reduced cost. It is another principal aspect of this invention to provide a clutch master cylinder housing which may be fabricated from relatively inexpensive techniques such as the deep forming of metal.

The above principal aspects of this invention are provided by incorporating a hydraulic fluid reservoir internally within the master cylinder housing. Specifically, the fluid reservoir chamber is a cylindrical chamber extending colinearly with the master cylinder working chamber and formed by a reduced diameter section of the same tube which forms the actuation plunger cylinder. A low spring constant coil spring is provided which biases a reservoir plunger within the reservoir to ensure that the hydraulic fluid therein is lightly compressed to avoid the introduction of atmospheric gases within the hydraulic circuit.

As a further further of the invention, the fluid contained within the reservoir may be pressurized to a greater than atmospheric pressure so that it will act to provide a degree of boost to the hydraulic system.

Additional benefits and advantages of the present invention will become apparent to those skilled in the art to which this invention relates upon a reading of the described preferred embodiment of this invention taken in conjunction with the accompanying drawings.

DESCRIPTION OF THE DRAWINGS

FIG. 1 is a longitudinal cross-sectional view of the clutch actuating master cylinder according to this invention illustrating the position of the constituent components when the clutch is in an engaged position and the fluid reservoir has not accepted an appreciable quantity of displaced hydraulic fluid.

FIG. 2 is another longitudinal cross-sectional view of the clutch master cylinder according to this invention illustrating the position of the constituent components when the clutch pedal is depressed thereby disengaging the clutch mechanism and further illustrating the position of the reservoir plunger when the reservoir has accepted a quantity of displaced hydraulic fluid. This figure further differs from the structures showin in FIG. 1 in that the outlet port and the fill and bleed port fixtures are removed.

DETAILED DESCRIPTION OF THE PREFERRED EMBODIMENTS OF INVENTION

Figure 3:
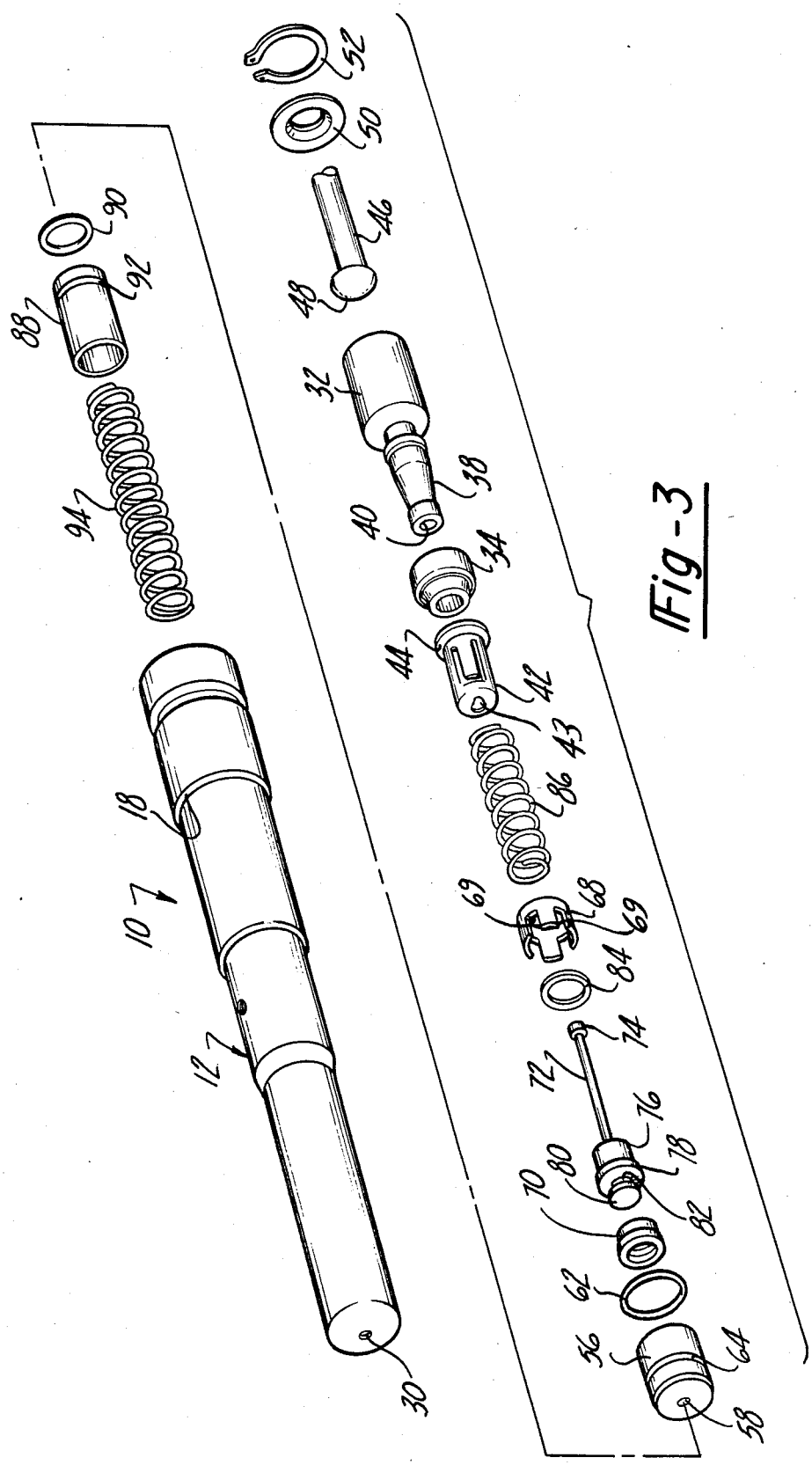
FIG. 3 is an exploded pictorial view of the constituent parts of the clutch master cylinder according to this invention.

The configuration of the various components of the master cylinder according to this invention will first be described followed by a description of the cooperation of elements during operation of the unit. The clutch actuating master cylinder according to this invention is illustrated in entirety by each of the figures herein and is generally designated by reference character 10. Housing 12 is formed from a cylindrical tube having a stepped internal bore which forms two different diameter sections, first diameter portion 14 and second diameter portion 16. First diameter portion 14 has a diameter greater than that of second diameter portion 16, thereby forming annular shoulder 17 therebetween. The exterior of housing 12 forms a cylindrical surface such that the wall of first diameter portion 14 forms an external diameter which is equal to or larger than the external diameter of the housing portion corresponding the second diameter portion 16. Housing 12 further forms radially extending flange 18 which acts to retain housing 12 in position with respect to mounting bracket 20 within which the housing is press fit or otherwise attached. Housing 12 further forms fill and bleed port 22 which is oriented in a vertically upward direction and downwardly directed outlet port 24. Housing 12 includes an opened end 26 formed adjacent first diameter portion 14 and closed end 28 which seals the end opposite 26 except that a small vent port 30 is provided which communicates the second internal diameter portion 16 with the atmosphere. Since the process of deep drawing of metal can be employed to produce tubes with constant or successive decreasing diameter sections, this process may be employed to form housing 12. Deep forming is a process preferable to processes which involve extensive machining since cost reductions may be realized.

Plunger 32 is disposed within first diameter portion 14 and is slidable therein. Plunger 32 includes annular sealing element 34 which is preferably constructed from an elastomeric substance which prevents hydraulic fluid leakage past plunger 32. Plunger 32 further forms dished out end 36. Mandrel portion 38 protrudes from the end of plunger 32 opposite end 36 and forms internal bore 40 opening in the surface of the mandrel and extending coincident with the longitudinal axis of the plunger and which bore terminates within the plunger. Plunger mandrel portion 38 is shaped to accept spring retainer 42 which forms radially extending flange 44. A radially inward biased finger 81 of spring retainer 42 maintains the retainer in engagement with mandrel portion 38. Push rod 46 is shown centrally broken away and is operatively associated with the clutch actuating foot pedal (not shown) within the interior compartment of a motor vehicle. Push rod 46 forms enlarged haed 48 which seats within dished out end 36 of plunger 32 when the push rod is forced to move to the left, with reference to the orientation displayed by the figures. Head 48 is kept in close proximity with plunger 32 by plunger head retainer 50 which is retained within housing open end 26 by snap ring 52 disposed with annular groove 54.

Disposed within first internal diameter portion 14 at the junction between portion 14 and second diameter portion 16 is plug 56. Between plunger 32 and plug 56 is formed a variable volume working chamber 96. Plug 56 features internal bore 58 and annular cavity 60 which has an internal diameter greater than bore 58. Plug 56 has a sufficient external diameter to prevent it from entering second diameter portion 16 by seating against shoulder 17 and further includes hydraulic seal 62 disposed within annular groove 64 of the plug. Check valve assembly 66 seated within annular cavity 60 includes cup 68 closely fitting therein. Cavity 60 has an internal bore coincident with the cylindrical axis of plug 56. Cup 68 further forms a plurality of longitudinal cut out portions 69, best shown with reference to FIG. 3. Trapped within annular cavity 60 by plug 56 and cup 66 is annular sealing structure 70. Valve stem member 72 spans between plunger 32 and plug 56 and includes plunger head 74 which causes the valve stem head to be trapped to move slidingly within internal bore 40. Plunger head 74 may be loaded into spring retainer 42 by providing a key slot 43 having an enlarged opening displaced from the longitudinal center of the retainer, which slot narrows at the center, thereby retaining the head when it is centrally positioned when so located by bore 40. The end of valve stem 72 opposite plunger head 74 forms plug head 76 and includes a radially extending flange surface 78 and a second radially extending flange 80 with a reduced diameter segment 82 therebetween. Seal structure 70 cooperates with flanges 78 and 80 and portion 82 such that it is retained in association with plug head 76. Interposed between flange 78 and the internal end surface of cup 68 is wavy washer 84 which, in a free state, assumes a curved configuration such as is shown by FIG. 2. In that condition, wavy washer 84 biases sealing structure 70 into sealing engagement with the radially projecting internal surface of plug 56 between bore 58 and annular cavity 60. Plunger return spring 86 is a helical spring which acts to bias plug 56 and plunger 32 apart. One end of return spring 86 engages radially extending flange 44 of spring retainer 42, while the other end contacts cup 68.

Within second diameter portion 16 of housing 12 is slidably disposed reservoir plunger 88, which includes fluid seal 90 retained within annular groove 92. Reservoir plunger 88 is urged toward plug 56 by the action of helical reservoir plunger biasing spring 94. Between reservoir plunger 88 and plug 56 is formed variable volume reservoir 98 which, as will be subsequently explained, may contain a volume of hydraulic fluid. The other side of plunger 88, that is, the space between it and end 28, is vented to the atmosphere by port 30.

The cooperation of elements and operation of clutch actuating master cylinder 10 according to this invention will now be described in detail. FIG. 1 illustrates master cylinder 10 when no external load is applied to push rod 46 such that the clutch assumes an engaged position since a fluid pressure signal is not provided to the clutch actuating slave cylinder (not shown). In this condition, plunger return spring 86 biases plunger 32 to the right until this motion is stopped by contact between the plunger and push rod head 48. In this position, contact between spring retainer 42 and valve stem plunger head 74 occurs exerting a tension load on valve stem 72. The spring constant of return spring 86 is chosen to be sufficiently great to cause compression of wavy washer 84 as it is compressed between flange 78 and cup 68. When wavy washer 84 is compressed, sealing structure 70 is moved to the right with reference to the orientation shown by the figures, and working chamber 96 is in communication with reservoir 98. Slots 69 of cup 68 provide an unrestricted flow path of fluid through check valve assembly 66. Therefore, in this condition, if a residual fluid pressure exists within working chamber 96, due to an excess of fluid in the fluid circuit, fluid will flow within reservoir 98 to the extent that this fluid pressure overcomes the counteracting force exerting by plunger biasing spring 94 exerted on reservoir plunger 88. The spring constant of reservoir plunger spring 94 is chosen to be very low such that a small residual hydrostatic pressure within the fluid circuit causes flow into reservoir 98. Such action will occur as the fluid circuit retained volume decreases as the clutch plate is worn. During some operating conditions, reservoir 98 will provide fluid to working chamber 96 which would occur, for example, when hydraulic fluid temperature changes causes a reduction in volume of the fluid within the fluid circuit. Therefore, reservoir 98 will provide or accept hydraulic fluid in accordance with the demands on the system.

FIG. 2 illustrates master cylinder assembly 10 when push rod 46 is forcibly driven by an occupant operated push pedal within the interior compartment. In this condition, plunger 32 is forced to move within working chamber 96 toward the left, thus causing an increase in the hydrostatic pressure therein. As this pressure increases, fluid is displaced from working chamber 96 to flow out of outlet port 24 to the fluid circuit, thereby causing actuation of movable pressure sensitive element within the clutch actuating slave assembly. As soon as the slightest amount of movement of push rod 46 occurs, the formerly mentioned tension load on valve stem 72 is no longer exerted since, in this condition, head 74 is able to freely translate within bore 40 of plunger 32. In this event, wavy washer 84 tends to assume its wavy free position thereby forcibly causing engagement between sealing structure 70 and plug annular cavity 60, thus preventing fluid transfer between working chamber 96 and resevoir 98. Thus, sealing structure 70 acts as a check valve preventing fluid flow between the reservoir and the working chamber when push rod 46 is depressed. This action is necessary since, if fluid were permitted to communicate with reservoir 98, a sufficiently high hydrostatic fluid pressure could no be created to actuate the clutch slave cylinder. Through repeated actuations of master cylinder 10, wear occurs within the clutch operating parts causing an increase in the volume of fluid which must be retained by the master cylinder and reservoir. Therefore, reservoir plunger 88, over the course of time, slowly translates to the left, with reference to the orientations shown by the figures, thus causing the internally contained volume within the reservoir to increase over time. Reservoir plunger return spring 94 exerts a light compressive load on reservoir plunger 88 thereby causing a slight hydrostatic pressure within the fluid contained therein, thus effectively preventing the undesirable ingestion of air or other contaminants.

With reference to FIG. 3, the assembly sequence of master cylinder 10 is evident. First, all seals are installed onto the associated parts. All components are then loaded into housing opened end 26 beginning with spring 94 and plunger 88. Next plug 56 is inserted and driven into engagement with shoulder 17. Cup 70, valve stem 72, spring 86, and retainer 42 are built as a subassembly onto plunger 32, and this subassembly is next loaded. Finally, push rod 46 is secured in position by retainer 50 and snap ring 52. Once installed, master cylinder 10 is charged with hydraulic fluid through fill and bleed port 22, which is also used to purge air from the system during initial assembly and during service.

In the embodiment described, the fluid pressure within the bore 96 and within the reservoir chamber 98 was atmospheric at the such times as the clutch was not operated due to depression of the clutch operating pedal and the push rod 46. However, it is possible to provide a greater than atmospheric pressure initially in the reservoir chamber 98, which greater pressure will also be exerted in the cylinder 96 so as to provide some small degree of boost to the hydraulic operation. In other regards, the operation and construction of such an embodiment would be the same as that already described and, for that reason, it is not believed to be necessary to repeat the description of the construction and operation.

While preferred embodiments have been described herein, it will be appreciated that various modifications and changes may be made without departing from the spirit and scope of the appended claims.

I claim:

1. An actuating master cylinder for providing a hydraulic pressure signal in response to an operator input for actuating a hydraulic device through a hydraulic circuit, said master cylinder comprising an integral cylindrical housing having a first, open end and an opposing second, generally closed end, a first large diameter cylinder bore extending from said open end toward said closed end, a second smaller diameter cylinder bore extending from the inner termination of said first cylinder bore and terminating adjacent said closed end, said first and said second cylinder bores being coaxial and defining a shoulder at their junction, a reservoir plunger having a diameter complimentary to said second cylinder bore and inserted therein through said open end, biasing means interposed between said closed end and said reservoir plunger for urging said reservoir plunger toward said first cylinder bore, a plug having a diameter complimentary to said first cylinder bore and inserted through said open end and fixed in engagement with said shoulder, said plug, said reservoir plunger and said second cylinder bore defining a reservoir, an actuating plunger having a diameter complimentary to said first cylinder bore and slidably received therein through said open end for pressurizing fluid in said second cylinder bore, said actuating plunger and said plug defining with said first cylinder bore a working chamber, means for actuating said plunger in response to an operator input for pressurizing said working chamber, an outlet port in said housing communicating said first cylinder bore with the associated hydraulic circuit, passage means extending through said plunger for communicating said reservoir chamber with said working chamber and check valve means for controlling the flow through said passage means for precluding flow from said working chamber into said reservoir chamber when said actuating plunger is actuated by an operator for pressurizing said working chamber and for permitting fluid to flow from said reservoir into said working chamber when said actuating plunger has not been actuated by an operator.

2. The master cylinder according to claim 1 wherein the initial pressure of the hydrualic fluid in the reservoir is greater than atmospheric.

3. The hydraulic fluid pressure supplying master cylinder according to claim 1 wherein said check valve means includes a valve stem having a first and second head, said first head retained by said working plunger and said second head carrying a sealing element, a cup trapping said sealing element within said plug, spring means biasing said sealing element in a position for preventing fluid flow between said working chamber and said reservoir when said external force is exerted, said valve stem causing said sealing element to move to a position allowing fluid flow between said working chamber and said reservoir when said external force is not exerted.

4. The master cylinder according to claim 3 wherein the initial pressure of the hydraulic fluid in the reservoir is greater than atmospheric.

* * * * *